United States Patent
Foley et al.

(10) Patent No.: US 8,200,367 B2
(45) Date of Patent: Jun. 12, 2012

(54) BULK MATERIAL TRANSPORT SYSTEM

(75) Inventors: James T. Foley, Mickleton, NJ (US); John B. Myhre, Pitman, NJ (US); Jason K. Daniel, Pitman, NJ (US); Manuel Spörri, Schlieren (CH)

(73) Assignee: K-Tron Technologies, Inc., Pitman, NJ (US)

( * ) Notice: Subject to any disclaimer, the term of this patent is extended or adjusted under 35 U.S.C. 154(b) by 778 days.

(21) Appl. No.: 12/211,769

(22) Filed: Sep. 16, 2008

(65) Prior Publication Data

US 2010/0070073 A1 Mar. 18, 2010

(51) Int. Cl.
G06F 17/00 (2006.01)
G06F 5/00 (2006.01)
G05D 13/00 (2006.01)

(52) U.S. Cl. .......... 700/240; 700/280; 700/305

(58) Field of Classification Search .......... 700/240, 700/283, 304, 305, 306; 222/1, 52; 702/173
See application file for complete search history.

(56) References Cited

U.S. PATENT DOCUMENTS

| | | | |
|---|---|---|---|
| 3,552,545 A | 1/1971 | Hartman | |
| 3,854,612 A | 12/1974 | Snape | |
| 3,981,417 A | 9/1976 | Fassauer | |
| 4,002,270 A | 1/1977 | Reiner | |
| 4,088,223 A * | 5/1978 | Bertrand | 198/761 |
| 4,199,282 A | 4/1980 | Johnson | |
| 4,221,306 A | 9/1980 | Althoff | |
| 4,312,462 A | 1/1982 | Faulkner | |
| 4,320,855 A | 3/1982 | Ricciardi et al. | |
| 4,331,263 A | 5/1982 | Brown | |
| 4,346,802 A | 8/1982 | Popper | |
| 4,350,243 A * | 9/1982 | Weyandt | 198/769 |
| 4,490,654 A | 12/1984 | Buchas | |
| 4,534,428 A | 8/1985 | Mosher et al. | |
| 4,534,429 A | 8/1985 | Konishi | |
| 4,544,101 A * | 10/1985 | Hahn et al. | 241/24.1 |
| 4,580,698 A | 4/1986 | Ladt et al. | |
| 4,595,125 A | 6/1986 | Alwerud | |
| 4,694,920 A * | 9/1987 | Naito et al. | 177/25.18 |
| 4,741,460 A * | 5/1988 | Blain et al. | 198/771 |
| 4,804,111 A | 2/1989 | Ricciardi et al. | |
| 4,811,835 A | 3/1989 | Bullivant et al. | |

(Continued)

FOREIGN PATENT DOCUMENTS

WO 9214126 A1 8/1992

(Continued)

OTHER PUBLICATIONS

Web printout of Vibratory Feeder Controls at rodix.com/vibratory_feeder_controls.cfm.

(Continued)

Primary Examiner — Charles Kasenge
(74) Attorney, Agent, or Firm — Morgan Lewis & Bockius LLP

(57) ABSTRACT

In a material handling system having a material feeder, a material container may be configured to discharge material to the material feeder and a process aid may be engaged with the material container, a method including determining a process indicator associated with a material flow characteristic of the feeder during operation of the feeder, determining a difference between the process indicator and an indicator threshold value, adjusting the operation of the process aid based on the value of the difference determined above between the process indicator and the indicator threshold value.

74 Claims, 7 Drawing Sheets

U.S. PATENT DOCUMENTS

| | | | |
|---|---|---|---|
| 4,830,508 A | | 5/1989 | Higuchi et al. |
| 4,893,262 A | | 1/1990 | Kalata |
| 4,936,489 A | | 6/1990 | Blain et al. |
| 4,954,975 A | | 9/1990 | Kalata |
| 4,972,970 A | | 11/1990 | Toerner |
| 5,046,643 A | | 9/1991 | Dumbaugh |
| 5,054,606 A | * | 10/1991 | Musschoot ............ 198/751 |
| 5,074,403 A | * | 12/1991 | Myhre ............ 198/751 |
| 5,102,586 A | * | 4/1992 | Fuji et al. ............ 264/40.1 |
| 5,132,897 A | | 7/1992 | Allenberg |
| 5,260,880 A | * | 11/1993 | Tump ............ 700/240 |
| 5,327,947 A | | 7/1994 | McGregor |
| 5,340,211 A | | 8/1994 | Pratt |
| 5,341,307 A | | 8/1994 | Myhre |
| 5,423,216 A | | 6/1995 | Kitamura et al. |
| 5,423,455 A | | 6/1995 | Ricciardi et al. |
| 5,462,010 A | | 10/1995 | Takano et al. |
| 5,472,079 A | * | 12/1995 | Yagi et al. ............ 198/762 |
| 5,657,902 A | | 8/1997 | Kraus |
| 5,767,455 A | * | 6/1998 | Mosher ............ 177/64 |
| 5,883,478 A | * | 3/1999 | Thesling ............ 318/119 |
| 5,906,294 A | * | 5/1999 | Ikeya et al. ............ 222/55 |
| 5,967,429 A | | 10/1999 | Ulfik et al. |
| 5,979,512 A | | 11/1999 | McGregor et al. |
| 6,000,446 A | | 12/1999 | Wegman et al. |
| 6,057,515 A | | 5/2000 | Murai et al. |
| 6,132,157 A | | 10/2000 | Comardo |
| 6,168,010 B1 | | 1/2001 | Komatsu |
| 6,273,153 B1 | | 8/2001 | Reinsch |
| 6,276,516 B1 | | 8/2001 | Bagust et al. |
| 6,749,816 B1 | | 6/2004 | Hasegawa et al. |
| 6,814,317 B2 | | 11/2004 | Watanabe |
| 6,892,586 B1 | | 5/2005 | Welch et al. |
| 6,896,732 B2 | | 5/2005 | Fickett et al. |
| 7,055,559 B2 | | 6/2006 | Reinsch et al. |
| 7,147,361 B2 | | 12/2006 | Cecala et al. |
| 7,222,750 B2 | | 5/2007 | Mosca |
| 7,275,498 B2 | | 10/2007 | Martin et al. |
| 7,320,561 B2 | | 1/2008 | Ambs |
| 7,328,960 B2 | * | 2/2008 | Sakagami et al. ............ 347/19 |
| 2001/0024096 A1 | | 9/2001 | Moran et al. |
| 2003/0143324 A1 | * | 7/2003 | Delzer et al. ............ 118/688 |
| 2004/0042335 A1 | | 3/2004 | Cecala et al. |
| 2006/0137452 A1 | * | 6/2006 | Grimshaw ............ 73/579 |
| 2006/0151525 A1 | | 7/2006 | Wahl |
| 2008/0053791 A1 | | 3/2008 | Swinderman et al. |
| 2008/0095910 A1 | | 4/2008 | Wenger et al. |

FOREIGN PATENT DOCUMENTS

| | | |
|---|---|---|
| WO | 2008020338 A2 | 2/2008 |

OTHER PUBLICATIONS

Web printout of Volumertric Feeders at vibrascrew.com/p-volmetric_feeders.shtml.

Web printout of Solidsflow™ Controlled Rate Discharger at accuratefaders.com/solidsflowfeeders.html.

Web printout of Discount® DS-Series Integrated Controllers at accuratefeeders.com/controls_gravcont.html.

Du. W.Y.; Dickerson, S.L. Vibratory Feeder Control Using Modified PWM Signals, International Conference on Intelligent Systems, Jun. 1999, pp. 82-87.

International Search Report for PCT/US2009/056826 dated Nov. 2, 2009.

\* cited by examiner

BULK MATERIAL TRANSPORT SYSTEM

BACKGROUND OF THE INVENTION

This invention relates to a material transport system including loss-in-weight feeders and their control systems.

In some bulk material transport systems some materials, when put into a material container, do not flow out consistently and uniformly without some assistance. In one example, a difficult material may form a self-supporting arch or bridge in the material container, which completely blocks the flow of material to a feeder at the outlet of the material container. The feeder may discharge the loose material below the bridge and then material flow from the feeder may stop even though there is a great deal of material still in the material container. A second failure mode is referred to as a rat hole, which is a narrow vertically oriented tunnel through the material. A rat hole often forms above a bridge and provides a restricted material flow path to the feeder at the outlet of the material container. The result is a sporadic or limited flow of material to the feeder as material from the top surface falls into the rat hole. Usually the flow stops long before the material container is empty. Lesser degrees of these conditions also occur. In these cases, a bridge or rat hole may form and later collapse spontaneously. Although material flow to the feeder may not be stopped completely it still affects the consistency of the feeder performance.

SUMMARY OF THE INVENTION

In one embodiment of the method of the present invention involves a bulk material handling system having a material feeder, a material container configured to discharge material to the material feeder and a vibrator configured to vibrate the material container. The method includes maintaining consistent flow that includes a) periodically calculating a process variable associated with a material flow characteristic of the feeder during operation of the feeder, b) determining a process variable slope during a selected time interval, the process variable slope defined as a rate of change in the process variable, c) determining a difference between the process variable slope and a threshold value, and d) adjusting the operation of the vibrator based on the value of the difference determined between the process variable slope and the threshold value.

In one embodiment, the difference between the process variable slope and the threshold value is indicative of a deteriorating flow condition in the material container.

In a further embodiment, the process variable is an average feed factor calculated by the equation:

$$FF_{avg} = \frac{\sum_{n=1}^{N} \frac{MF}{\% MS}}{N}$$

wherein $FF_{avg}$ is the average feed factor, MF is the mass flow rate through the feeder and % MS is a ratio of a current motor speed of the feeder to a maximum motor speed of the feeder and N is a predetermined number of time intervals.

In one embodiment of the method, adjusting the operation of the vibrator includes changing the amplitude of vibration. In another, adjusting the operation of the vibrator includes changing the frequency of vibration or adjusting the operation of the vibrator includes increasing the amplitude of vibration by a predetermined amount when the value of the difference between the process variable slope and the threshold value is less than zero.

In a further embodiment, adjusting the operation of the vibrator includes increasing the amplitude of vibration when the difference between the process variable slope and the threshold value is less than zero and decreasing the amplitude of vibration when the difference between the process variable slope and the threshold value is greater than or equal to zero.

In one embodiment, the selected time interval is based at least in part upon a user defined set-point, and the user defined set-point is based at least in part upon a selected flow rate of material through the feeder.

In one embodiment, the method further includes establishing a minimum output for the vibrator, and adjusting the minimum output for the vibrator based upon the difference determined between the process variable slope and the threshold value.

In one embodiment of the method, the vibrator frequency is adjustable and the method further includes setting the vibrator frequency to operate at a frequency that is based upon a system resonance point. In one embodiment, the adjusting the operation of the vibrator takes place in advance of a significant flow disruption in the material container.

In one embodiment of the method, the significant flow disruption is characterized by a material flow rate through the material container that is substantially different from a material flow rate through the material feeder. The method further includes adjusting the threshold value in response to the detection of a flow condition in the material container. Wherein the flow condition is characterized by the process variable being substantially constant for a selected period. In one embodiment, the flow condition is characterized by the process variable being substantially different for a selected period.

In one embodiment, the flow condition is associated with a weight disturbance. In another embodiment, the flow condition is taken from the group consisting of a) a change in mass flow from the material container in excess of a predetermined value, b) vertical tunneling, c) bridging, and d) a significant time without a negative flow condition.

In one embodiment of the method, the adjusting the operation of the vibrator based on the value of the difference between the process variable slope and the threshold value includes decreasing at least one of vibrator amplitude and vibrator frequency when the value of the difference determined between the process variable slope and the threshold value is greater than zero after a selected time period. The method further includes adjusting at least one of vibrator frequency and vibrator amplitude based on the fill level in the material container.

In one embodiment, a bulk material transfer system includes a bulk material container, a process aid with a variable output engaged with the bulk material container, a feeder positioned to receive bulk material from the bulk material container, and configured to transfer the bulk material through the feeder, and a control system configured to identify a trend associated with the transfer of bulk material through the feeder and configured to affect a change in the variable output of the process aid based on the trend.

In one embodiment, the control system is configured to a) periodically calculate a process variable associated with a material flow characteristic of the feeder during operation of the feeder, b) determine a process variable slope defined as a rate of change in the process variable during a selected time interval, c) determine a difference between the process variable slope and a threshold value, and d) adjust the operation of the process aid based on the value of the difference determined between the process variable slope and the threshold value.

In one embodiment of the system, the process aid is mounted outside the material container. In one embodiment, the material container is an asymmetrical feed hopper. In one embodiment, the feeder is a loss-in-weight feeder. In one embodiment, the process aid is a vibrator. In another embodiment, the process aid is taken from the group consisting of, a vertical agitator, an air bladder, an air pad, an air injector, an impactor, an auger, a horizontal agitator, a sonic device, an acoustic device, and a mechanically actuated flexible liner.

In one embodiment, the process aid is dynamically adjustable to allow the variable application of energy from a lower level of energy when deteriorating flow conditions are not detected to a higher level of energy in when deteriorating flow conditions are detected. In one embodiment, the trend is associated with a material flow condition in the system. The material flow condition includes a substantial disparity between a material flow rate through the material container and a material flow rate through the feeder.

In one embodiment, the trend is associated with a process indicator and the controller is configured to change the variable output of the process aid based at least in part on the process indicator. The controller changes the variable output based at least in part upon a comparison of the process indicator to an indicator threshold.

In one embodiment, the process indicator includes a rate of change in a process variable during a selected time interval. In one embodiment, the process variable is a characteristic of the feeder. In one embodiment, the process variable is determined by the equation:

$$PV = \frac{\sum_{n=1}^{N} \frac{FR}{\% FR}}{N}$$

wherein PV is the process variable, FR is a flow rate through the feeder, % FR is a ratio of a current motor speed of the feeder to a maximum motor speed of the feeder, and N is a time factor taken from the group consisting of a predetermined number of time intervals and a predetermined period of time.

In one embodiment, the indicator threshold is based upon a material processing characteristic.

In a material handling system having a material feeder, a material container configured to discharge material to the material feeder and a process aid engaged with the material container, a method including determining a process indicator associated with a material flow characteristic of the feeder during operation of the feeder, determining a difference between the process indicator and an indicator threshold value, and adjusting the operation of the process aid based on the value of the difference determined between the process indicator and the indicator threshold value.

In one embodiment, the difference between the process indicator and the indicator threshold value is indicative of a deteriorating flow condition in the material container. The process indicator includes a rate of change in a process variable during a selected time interval.

In one embodiment, the process variable is an average feed factor calculated by the equation:

$$FF_{avg} = \frac{\sum_{n=1}^{N} \frac{MF}{\% MS}}{N}$$

wherein $FF_{avg}$ is the average feed factor, MF is the mass flow rate through the feeder and % MS is a ratio of a current motor speed of the feeder to a maximum motor speed of the feeder and n is a predetermined number of time intervals.

In one embodiment of the system, the process aid is a vibrator and adjusting the operation of the process aid includes varying at least one of an amplitude and a frequency of the vibrator. Adjusting the operation of the process aid takes place in advance of a significant flow disruption in the material container. The significant flow disruption is characterized by a material flow rate through the material container that is substantially different from a material flow rate through the material feeder.

In one embodiment, the method further includes adjusting the indicator threshold value in response to the detection of a flow condition in the material container. The flow condition is characterized by a process variable being substantially constant for a selected period.

In one embodiment of the method, further includes establishing a minimum output for the process aid, and adjusting the minimum output for the process aid based upon the difference determined between the process indicator and the indicator threshold value.

In one embodiment, the process aid includes a vibrator and the minimum output for the process aid is a vibrator amplitude that is approximately the lowest operational vibrator amplitude of the material handling system.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain various features of the invention.

Figure 1:
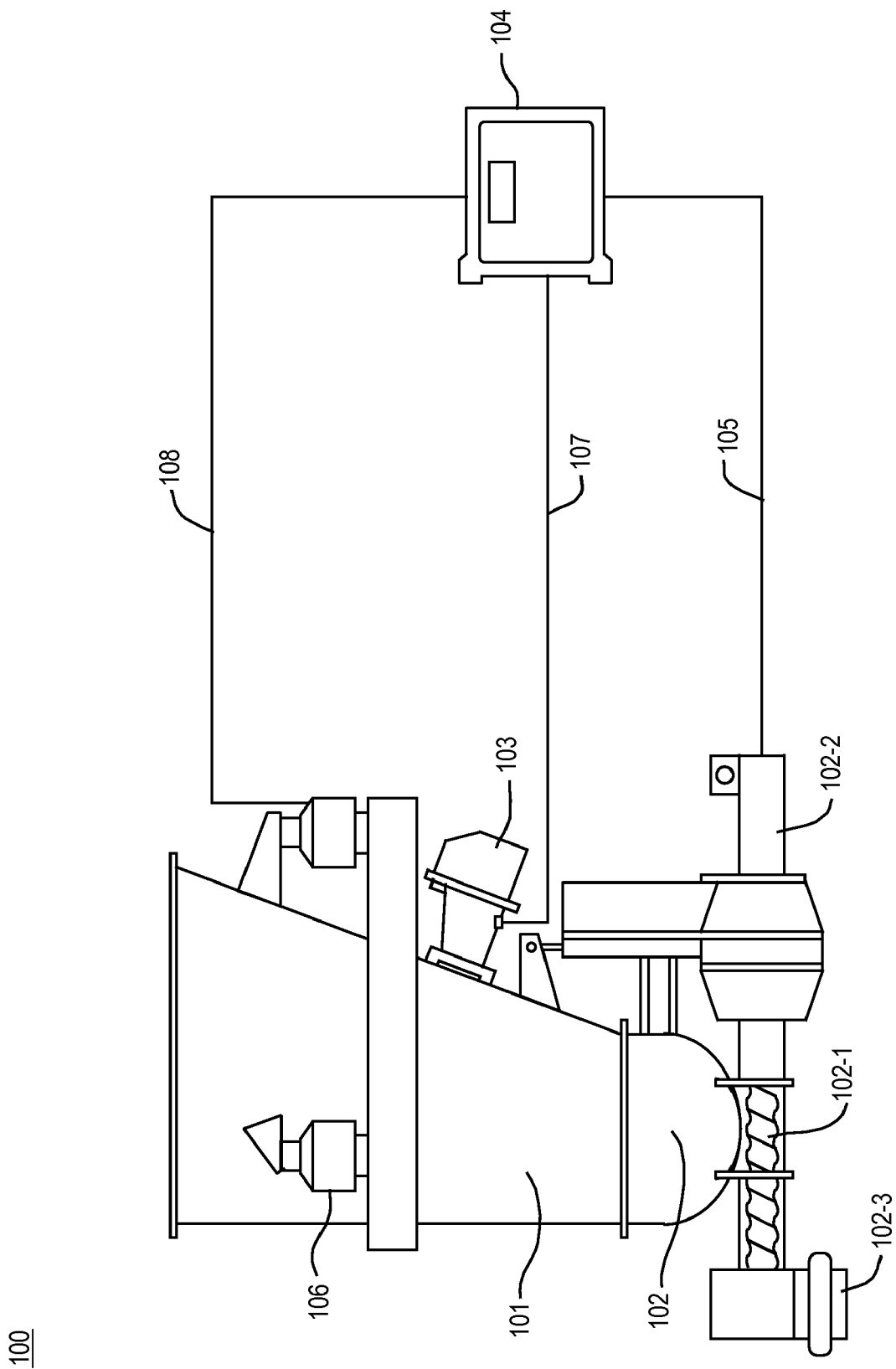
FIG. 1 is a schematic view of an exemplary system in accordance with one embodiment of the invention.

The above have been offered for illustrative purposes only, and are not intended to limit the scope of the invention of this application, which is described more fully in the drawings and claims sections set forth below.

DETAILED DESCRIPTION OF PREFERRED EMBODIMENTS

FIG. 1 illustrates an embodiment of a bulk material transfer system 100. The embodiment of FIG. 1 is intended as an example and should not be considered limiting. The bulk material transfer system 100 may be used for feeding bulk materials, for example, solids (such as granules, pellets, fibers, and powders), slurries, or liquids, or any combination of the foregoing. Examples of such materials include: TiONA RCL-69, Tytanpol R-003, Granulated Sulphur Mix, 5-ASA Mesalazine, IRGANOX 1010, Steamic OOS, IRGAFOS 168, Zinc Stearate, Div. Ca-Stearates, Zinc Oxide, Crodamide ER, Div. Chimassorbe (2020, 944, 119), Saytex 8010, Fosetyl-Aluminium Technical, Sodium Benzoate, IRGANOX 1098, Tinuvin 622, IRGANOX 130, Red Seal Zink, Code F IUB, Magnesium Stearate, Finawax E, and Pancake mixPerkadox 14-40B-PD, Uniplex FE-700+Acrowax, Hycite, Irgastab NA UH 11, Irgaclear DM, Irgaclear D, DHT-4a, and Millad 3988. In one embodiment, bulk material transfer system 100 avoids or limits the formation of bridges, rat holes, and/or weighing disturbances, and resulting flow irregularities, as bulk material is dispensed.

In one embodiment, bulk material transfer system 100 includes material container 101, feeder 102, process aid 103, and controller 104. In some applications, bulk material transfer system 100 is a loss-in-weight feeder system.

In one embodiment of FIG. 1, bulk material transfer system 100 includes bulk material container 101 (e.g., a hopper). Material container 101 holds material to be fed using the bulk material transfer system 100. The material held in the material container 101 may be periodically replenished using a storage container (not shown) or other filling equipment or other means.

In one embodiment, material container 101 discharges material to feeder 102. According to some arrangements, material container 101 funnels the material primarily by gravity. The shape of the material container 101 may be symmetrical or asymmetrical. The shape of the material container 101 may be cylindrical, square, hexagonal, conical, frusta-conical, elliptical, or asymmetrical and/or have a wider fill portion located above a smaller discharge portion. While FIG. 1 illustrates a single material container 101, multiple containers may be provided.

Material container 101 in FIG. 1 may be made from a multitude of materials including wood, metals, plastics, and elastomers. For example, steel, stainless steel, aluminum, or other metal may be used where appropriate for the environment in which the material container is utilized and the type of material being handled. The volume of the container 101 may be, for example, 50-180 liters.

In one embodiment, feeder 102 receives material discharged from the bulk material container 101 and transfers the material that ultimately is supplied to a receptacle, container or other destination. Feeder 102 may transfer the material directly to the receptacle, container or other destination, or other equipment position between feeder 102 and the destination. As shown in the embodiment of FIG. 1, feeder 102 includes screw 102-1 that may be driven by drive motor 102-2 and has a discharge end 102-3. Feeder 102 may include one or more augers, agitators, vibratory trays, belts, screw feeders, rotary paddles, or other type device that are configured to transfer material with an appropriate drive. In some applications, it is desirable that feeder 102 transfer material continuously and precisely. For example, feeder 102 may be controlled to deliver the particular volumetric or mass flow rate output desired by the user.

More particularly, in the example depicted in FIG. 1, feeder 102 is a screw feeder located below and contiguous to the material container 101 so that material will flow by gravity out the discharge portion of the material container 101 directly into the feeder 102. Feeder 102 may then transfer the material by turning its screw at a rotational speed commensurate with the required flow rate. As described below, smooth and unobstructed flow of material from the material container 101 to the feeder 102 may be achieved.

The bulk material transfer system 100 further a further include controller 104 and process aid 103 configured to apply energy to the material container 101 in material container 101. In one embodiment, process aid 103 is configured to apply energy to container 101 (e.g., in response to control signals sent by controller 104 via control line 107). Also, in the embodiment of FIG. 1, the controller 104 connects to the feeder 102 via control line 105.

In one embodiment, material container 101 has a discharge end that transfers material directly to a feeder 102 that further transfers the material through the feeder. In one embodiment, system 100 includes a process aid 103 with a variable output such that the energy coupled from the process aid 103 to the material container 101 can be varied. Process aid 103 may be coupled to the material container 101 to assist the flow of material from the material container 101. For example, process aid 103 may be coupled to the outside of material container 101. In one embodiment, process aid 103 includes any device configured to impart energy to material contained within material container 101.

In one embodiment, process aid 103 is coupled to the outside of material container 101. In some applications, it is preferable not to have objects inside the material container or penetrating the material container wall. An exemplary benefit of coupling process aid 103 to the outside of material container 101 is to avoid process aid 103 coming into contact with material within material container 101. In some applications, such as where contact with material is not problematic, process aid 101 may be located within material container 101.

In one embodiment, process aid 103 is dynamically adjustable. For example, process aid 103 may be adjusted automatically during the operation of system 100. In some applications, process aid 103 is dynamically adjusted in response to operation characteristics of system 100. For example, those operation characteristics may be a function of the rate of material flow through system 100 or through an individual component of system 100 such as feeder 102.

By way of further example, an output of process aid 103 may be varied under control of the controller 104 so as to vary the energy applied to the material container 101 and/or the material and material container 101. Various types of process aids may be used. In one embodiment, the process aid 103 may include one or more electromechanical actuators or vibrators that are connected to the exterior of the material container 101. The vibrator's amplitude and frequency may be dynamically and independently adjustable over ranges, and the vibrators may be connected for closed-loop amplitude and frequency feedback control.

In one embodiment, where the process aid includes a vibrator, the vibrator may be operated at a frequency at or near the system's resonance frequency. In one application, operating the vibrator at or near the resonance frequency permits the vibrator to achieve the desired amplitude modulation efficiently. Thus, the controller 104 may adjust or vary the amplitude or frequency as necessary in response to a current operating condition. Examples of process aid 103 include a vertical agitator (e.g., top or bottom driven low speed vertical agitators), air bladders, air pads (e.g., BinMaster model Airbrator), air injectors (e.g., WAM Group Part # UO25), impactors, augers, horizontal agitators, sonic devices, acoustic devices, mechanically actuated flexible liners like the Brabender Flex Wall Feeder, model no. DDW-MD5-FW40 and K-Tron Shear Hopper, part no. 0913900080, custom container configurations, combinations thereof and the like. In some embodiments, process aid 103 is located around the interior perimeter of the container.

In one embodiment, vertical agitators are process aids that are located around an interior perimeter of the material container. In some configurations, dynamic control of the agitator is made by adjusting the speed of the agitator motor in some embodiments the adjustment is made in accordance with a speed profile (e.g., during a time interval). The same control techniques can be applied to a horizontal agitator.

Air nozzles or air pads located in a material container wall may be used to aerate material to promote flow. By controlling the amount of air introduced over a time interval, as well as sequencing of individual or multiple units, control of these devices may be achieved. In one embodiment, an air pad disperses air over a larger area then an air nozzle. The air pad may also vibrate as air escapes from between the material container wall and its elastomer cone. In one embodiment, the vibration is uncontrolled.

In one embodiment, an air bladder is an airtight flexible membrane attached to the interior wall of the material container. In some configurations multiple air bladders are placed in a material container. The bladder may be inflated with air to move the material in the material container and promote flow. The air bladders may also be inflated and deflated in sequence so that the interior volume of the material container is held constant and the material is only shifted and not compacted. Control of the air bladder can be accomplished by varying rate, period, and volume of inflation as well as the sequencing of multiple bladders. In one configuration, air can be rapidly pulsed into the bladder to create shock waves or vibration in the bulk material to promote flow.

Flexible wall material containers may be actuated by mechanical devices to promote material flow. In one embodiment, the flexible walls are moved by a fixed mechanical linkage driven by a motor resulting in a constant displacement and a constant displacement profile. In the simplest control scheme, the motor speed can be varied. Using more sophisticated motion control devices or mechanics, a variable displacement, speed, and motion profile can be generated.

Acoustic and sonic devices for flow aids may take the form of a tuned horn in order to generate sufficient power to affect the material flow. The acoustic and sonic devices need not be run continuously. To actively control the acoustic and sonic devices, the time duration of the blast and the time between blasts can be varied. In addition, where multiple horns are employed the sequencing of the horns can be controlled.

For example, if the process aid 103 includes an air injector system, the variable output may correspond to an increase or decrease in air pressure and/or an increase or decrease in air pulse frequency. In an embodiment in which the process aid 103 includes an acoustic wave generator, the variable output may correspond to an increase or decrease in acoustic amplitude and/or frequency.

The bulk material transfer system 100 may also include a weight scale system 106. In one embodiment, controller 104 connects to weight scale system 106 via control line 108. The weight scale system 106 may include load cells or scales that continuously measure the weight of the material container 101, feeder 102, or process aid 103, or a combination of these. In one embodiment, weight scale system 106 is configured to determine the weight of material in these structures. In one embodiment, an array of load cell transducers may be configured to measure the weight of the material container 101, feeder 102, and process aid 103, and sense the weight of the material being discharged from feeder 102 by, for example, subtracting the tare weight of the same components. The weight of the material may be continuously sensed by the load cells and the data processed by controller 104. The load cells may include filters that filter noise from external electronic devices, mechanical movement of the feeder, and environmental effects, such as vibration from nearby machines. The load cells may be, for example, 120 kg SFT-II Part #310190042 and 90 kg D5 Platform Scale Part #0000000003, manufactured by K-Tron International Inc. of Pitman, N.J.

Controller 104 may sense input data, compile, analyze, store, and output data to the components connected to it. In one embodiment, the control system includes a controller 104 that communicates with the weight scale system 106, the feeder 102, and the process aid 103. The controller 104 can receive data from the weight scale system 106 over control line 108, which may be a serial weight channel. The controller 104 may also monitor and control the operation of the feeder 102 (e.g., via control line 105); and monitor and control the operation of the process aid 103 via control line 107. An example of a controller is the K-Tron Control Module, KCM LWF part nos. 0000004041 and 0000002610.

Figure 2:
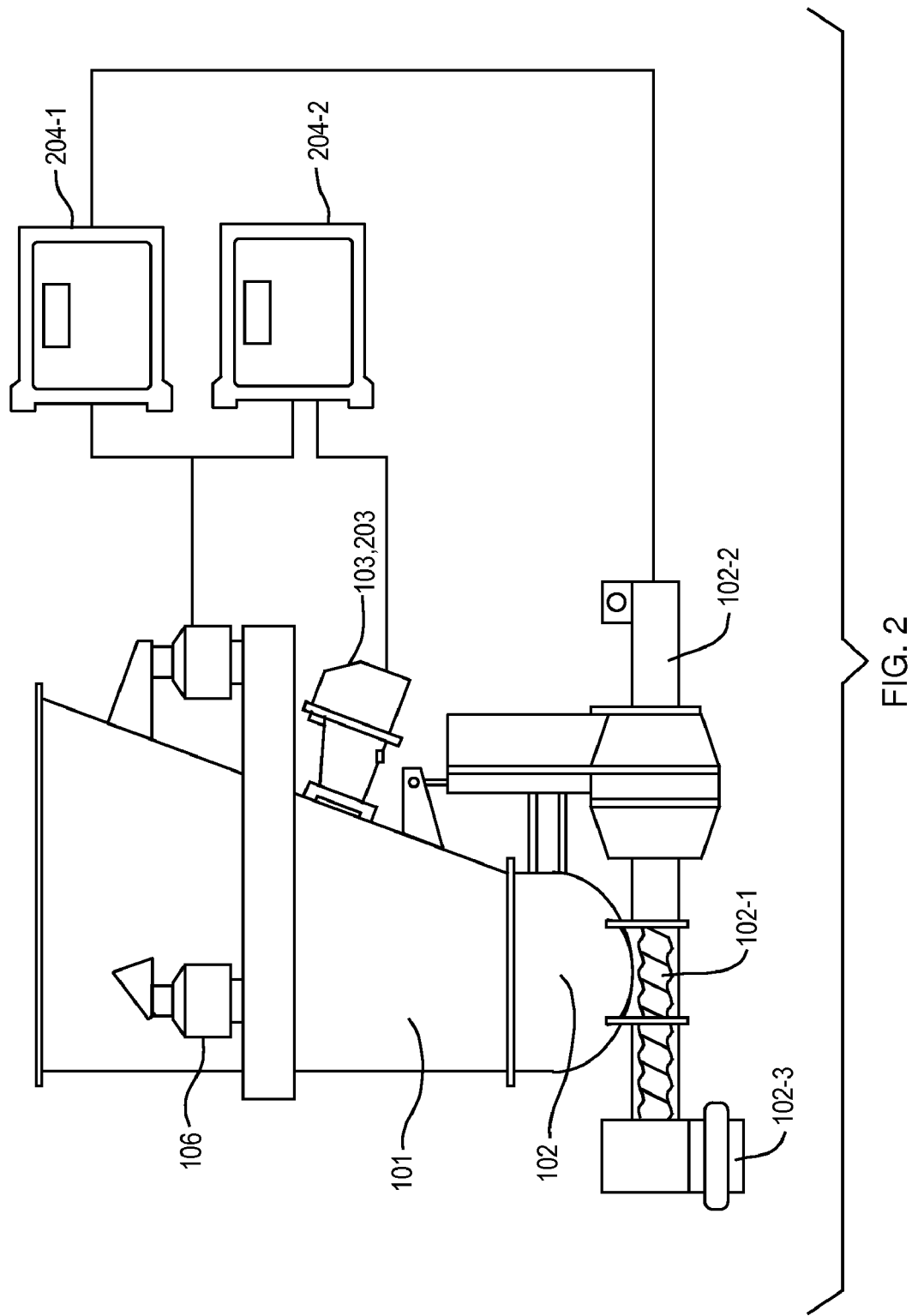
FIG. 2 is a schematic view of another exemplary system in accordance with one embodiment of the invention.

FIG. 2 illustrates another embodiment of a bulk material transfer system. FIG. 2 includes the same general components as FIG. 1, except as provided below. The bulk material transfer system 200 of FIG. 2 includes a first controller 204-1 and a second controller 204-2. In one embodiment, the functions of the first controller 204-1 and the second controller 204-2 are performed in controller 104. In one embodiment, the first controller 204-1 is connected to the feeder 102, the scale system 106, and the second controller 204-2. The second controller 204-2 may connect to the process aid 103 and the scale system 106. An example of the second controller 204-2 is the K-Tron ActiFlow Control Unit part no. 0000015859. In one embodiment, process aid 103 which may be a vibrator 203 is configured to apply energy to the material in material container 101 under control of controller 204-2 (e.g., indirectly by applying energy to material container 101 or directly). The second controller 204-2 can store a floor setting, as discussed below. More particularly, the second controller 204-2 may receive data from the scale system 106, the process aid 103, and the feeder 102 and control process aid 103 with closed-loop feedback control. Alternatively or in addition, controller 204-1 may receive data from the feeder 102, the scale system 106 and the process aid 103 and control the process aid 103 via controller 204-2 with closed-loop feedback control. As above, the process aid 103 may be controlled to vary the energy applied by the process aid 103 to the material container 101.

An example of system operation will now be provided using the bulk material transfer system 100 of FIG. 1 as an example. Generally, material flow through the bulk material transfer system begins with the material container 101 being filled by a storage container or other fill device (not shown). In one embodiment, the material container 101 funnels material from the fill portion to the discharge portion, primarily by gravity, and into the feeder 102 located below and contiguous to the material container's discharge portion. The feeder 102 may then transfer the material by screw feed to a discharge end of the feeder 102-3 where the material is discharged into some receptacle or processing equipment (not shown). Process aid 103, under control of controller 104, may assist material flow through the material container 101.

In one embodiment, without the process aid 103 a material, such as a fine powder, may form a self-supporting arch or bridge in the material container 101, which may affect the flow of material to the feeder 102. The feeder 102 may discharge loose material below the bridge and then material flow from the feeder 102 may stop even though there is a great deal of material still in the material container 101.

Various process variables may be ascertained to provide system performance-information and/or used to provide operational adjustments to system 100. For example, controller 104 may receive continuous weight data from the weight scale system 106, and calculate a discharge mass flow rate from the feeder 102. For example, the discharge mass flow rate may be the difference in material weight (ΔW) over a period of time (Δt). The discharge flow rate may be compared to a user defined set-point of the mass flow rate.

In general, the process variable may be any of several values that characterize or are indicative of the material flow through the system. For example, the process variable may be a mass flow rate, the InstFF, an average instantaneous speed flow factor (InstFF$_{avg}$), a rate of change of the InstFF$_{avg}$ during a selected time interval, or other material flow characteristic of the system.

In one embodiment, controller 104 is configured to predict and/or detect deteriorating flow conditions. Comptroller 104 may be further configured to control process aid 103 to intervene preemptively, to arrest, and, in some embodiments, reverse the deteriorating flow conditions. In some embodiments, a process variable is determined by the system and used project or detect the deteriorating flow condition. For example, controller 104 may identify a trend associated with the transfer of material through the feeder 102 and then change the variable output of the process aid 103 based on the identified trend. The trend identified by the controller 104 may be associated with a process characteristic of the system, such as (e.g., a changing process) variable heralding a material flow condition. In one embodiment that changing process variable may be a changing efficiency factor. In one embodiment that changing process variable is a changing instantaneous feed factor (described below) or a function of a changing instantaneous feed factor (e.g., an average feed factor as described below). In one embodiment, a change to the variable output of the controller is based on a comparison of the process characteristic (e.g., a process variable) to a process characteristic set-point (e.g., a process variable set-point). In one embodiment, the process characteristic is a rate of change in a process variable during a selected time interval.

Alternatively or in addition, controller 104 may identify a trend associated with the transfer of material through feeder 102 and change the variable output of the process aid 103 based on the identified trend. In one embodiment, a component of the identified trend is a measure of the time over which that trend is observed. Thus, for example, the trend identified by the controller 104 may be associated with a process characteristic of the system, such as a change in a process variable during a selected time interval (e.g., a process variable associated with feeder 102, material container 101, or another system component).

The selected time interval may be a period of time selected in advance. In one embodiment, the selected time interval may be selected from a look-up table during the operation of the system, and in yet another embodiment, the selected time interval may be automatically selected, for example, as discussed below in connection with FIG. 4. In one embodiment, the selected time interval is set by a user. The selected time interval may be based, at least in part, upon a user defined set-point based on a selected flow rate of the material through the system (e.g., through feeder 102, through material container 101 or through another component of system 100, 200) such as described below.

Various process variables may be used by controller 104 to determine when to adjust process aid 103. In some configurations, the process variables are associated with a material flow characteristic. In one embodiment, a process variable termed an instantaneous feed factor (InstFF) may be used. In one embodiment, InstFF provides a snapshot estimate of the bulk material transfer system's operational performance (including for example, its operational efficiency). An InstFF may correspond to the calculated discharge mass flow rate from the feeder divided by the feeder screw speed (taken during the time period with which the mass flow rate was calculated, e.g., 250 ms) as a percentage of the maximum feeder screw speed i.e., 100%. For example, if the feeder screw speed is operating at 40% of its maximum speed, and the feeder's mass flow rate is calculated as 65 Kg/h, the InstFF would be calculated as 65/0.4=162.5 Kg/h. Thus, theoretically the feeder 102, at that moment in time, could achieve a maximum mass flow rate of 162.5 kg/h when the feeder screw is operating at 100% speed. In one embodiment, the InstFF may be a process variable associated with a material flow characteristic of the feeder 102.

In one embodiment, the process variable is calculated as the summation of instantaneous feed factors during a predetermined number of time intervals (which may or may not be the selected time intervals), divided by the percentage ratio of the current motor speed of the feeder to maximum motor speed of the feeder, divided by (N) which is a time factor which may be the predetermined number of time intervals or a predetermined period of time.

In one embodiment, the process variable is an average instantaneous feed factor (or average feed factor) determined by Equation (1) below wherein FF$_{avg}$ is the for average instantaneous feed factor, MF is the measured mass flow rate through a feeder, MS % is the percentage ratio of current motor speed of the feeder to the maximum motor speed of the feeder, and N is a time factor which may be the predetermined number of time intervals or a predetermined period of time. See for example, FIGS. 3A-3C steps 313-332.

$$FF_{avg} = \frac{\sum_{n=1}^{N} \frac{MF}{\% \, MS}}{N} \quad \text{Equation (1)}$$

In one embodiment, system 100 may be operated with consideration given to the type of material being processed by system 100. For example, different types of materials may be associated with different flow properties or flow characteristics that are reflective of the relative difficulty or ease with which a particular material may be processed. In one embodiment, that difficulty or ease is reflected by a material flow characteristic. In one embodiment, system 100 may be operated with consideration given to that material flow characteristic by operating system 100 at a setting that corresponds to the material flow characteristic. In one embodiment, the system setting is associated with a process characteristic set-point characteristic set-point.

In one embodiment, material that is difficult to process such as cohesive powders may require a process aid output with a higher energy level (e.g., corresponding to a greater amplitude vibration) than material that is easier to process. Thus, a process characteristic set-point may correspond to a minimum level of energy output for process aid 103. In one embodiment, the floor setting may be a minimum output for process aid 103 during the on-going operation of system 100.

As described in more detail herein, the output may be increased in response to a process variable during selective periods of operation of system 100 (e.g., such as when a deteriorating flow condition is detected or predicted to occur). The floor setting may also be adjusted to reflect long term difficulty or ease of operation. In one embodiment, the minimum level energy output is a floor setting of process aid 103 that may be dynamically adjusted. One method for dynamically adjusting such a floor setting is described in more detail below in connection with FIG. 5. Thus in one embodiment, the process characteristic set-point may be reduced or increased based upon whether the material is expected to be easy or difficult to process. It should be noted that several process characteristic set-points may be available for selection by the user. In one embodiment, the user can specify the process characteristic set-point based upon a menu of process characteristic set-points or by entering a process characteristic set-point that is not on the menu. In one embodiment, a material that is easily processed may be associated with a process characteristic set-point that is lower than a process characteristic set-point associated with a material that is more difficult to process. The process characteristic set-point may be established by bracketing the material processing characteristics of the different materials along a spectrum from easy to difficult categories.

As described in more detail herein, the operation of a process aid 103 may be adjusted before a significant disruption of material flow occurs. The significant flow disruption may be characterized by a material flow rate through material container 101 that is substantially different from a material flow rate through the feeder at a given time. In one embodiment, prior to a significant flow disruption in the material container 101, such as a bridge, the rate of change in the process variable during a selected time interval (i.e., in one embodiment, the process variable slope—itself a process variable) decreases rapidly and the output of process aid 103 can be increased to maintain and/or improve material flow in one embodiment the output of process aid 103 is increased if the difference between the process variable slope and a threshold value is a negative value. In one embodiment, where a difference between the process variable slope and the threshold value is a negative number, a deteriorating flow condition is predicted in the material container.

In one embodiment, the threshold value may be adjusted in response to the flow condition characterized by the process variable being either substantially constant or substantially different for a selected period. The selected period is preferably a time period selected in advance. In one embodiment, the selected period is selected from a look-up table during the operation of the system (e.g., automatically selected). In one embodiment, the threshold value may be adjusted based upon detection of an unexpected weight disturbance.

Figure 3A:
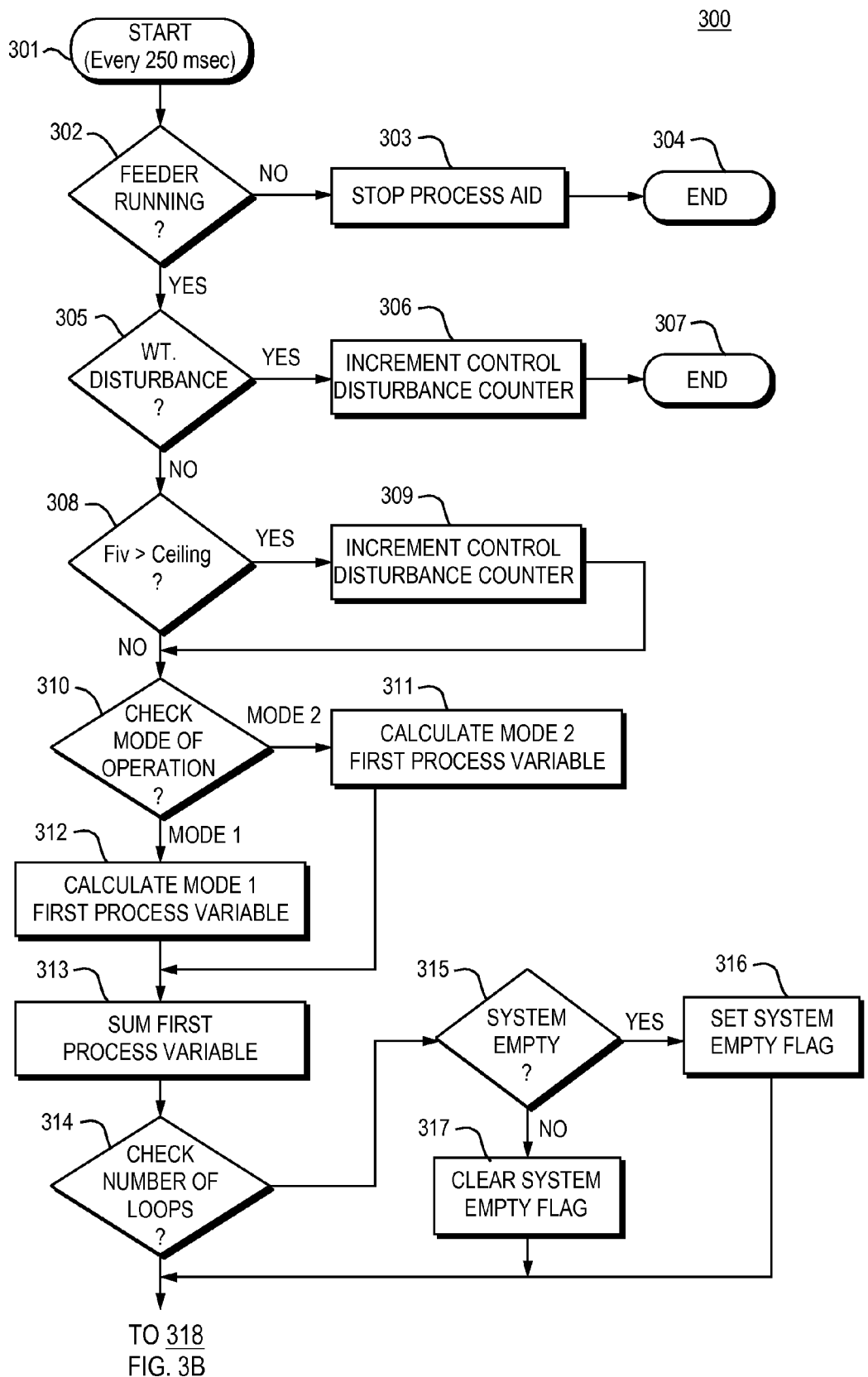
FIGS. 3A-3C provides an exemplary flow chart of a process for controlling a process aid during the operation of a material transfer system.
Figure 3B:
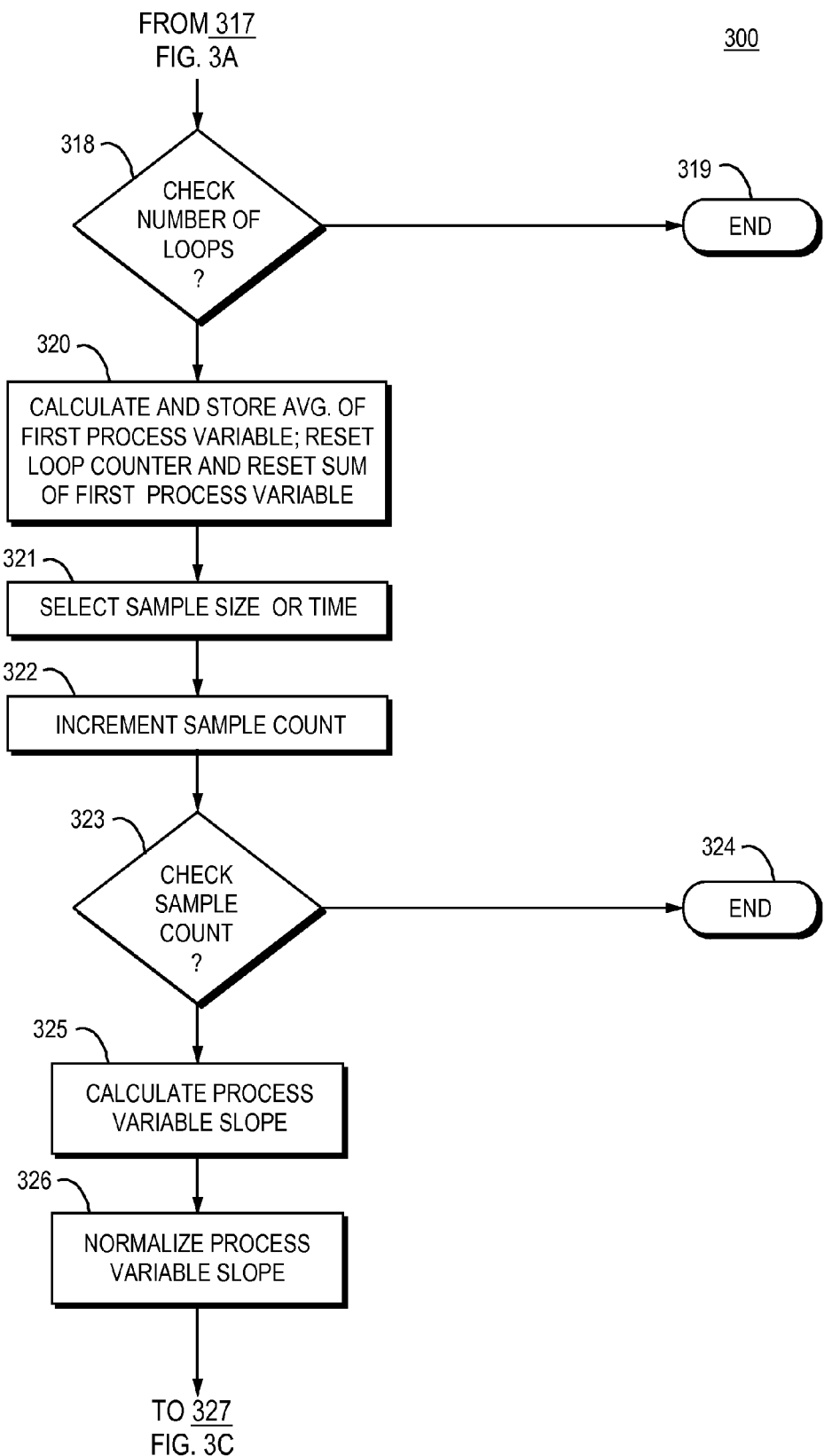
Figure 3C:
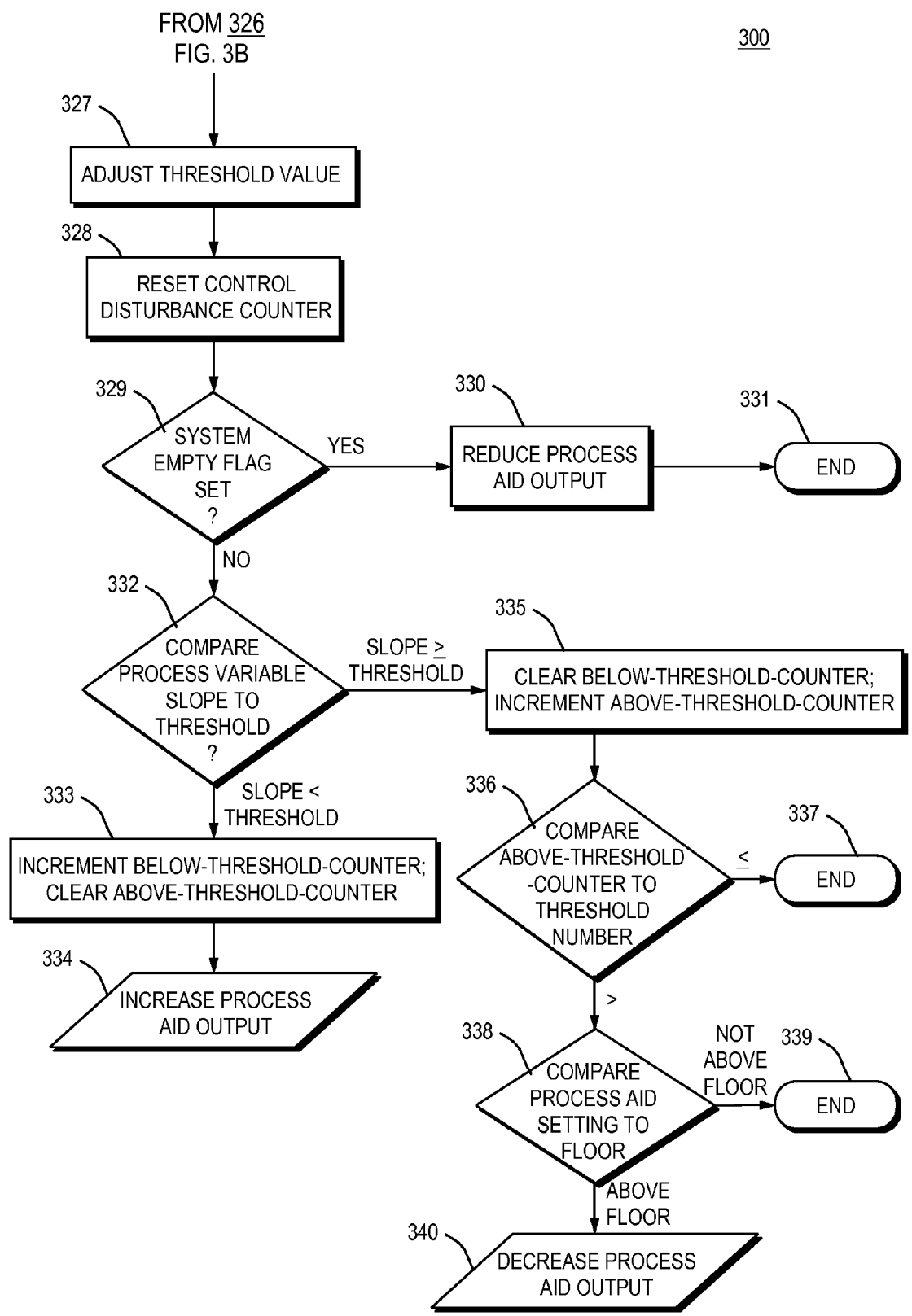

Referring now to FIGS. 3A-3C in one embodiment, the process steps executed by controller 104, are shown. The controller 104 may be, for example, a microprocessor-based controller.

As described in one embodiment, controller 104 is configured to identify a trend associated with the transfer of material through the feeder and configured to affect a change in the variable output of the process aid based on the trend.

One embodiment of a processes used by controller 104 is illustrated in FIGS. 3A-3C.

In FIG. 3A at step 301, controller 104 is capable of running the illustrated algorithm at predetermined time intervals, for example, every 250 msec. One of ordinary skill in the art would know that predetermined time intervals may be generated at different intervals as desired and consistent with the particular system employed. In step 302, controller 104 checks whether the feeder 102 is running or is stopped. If at step 302 the feeder 102 is not running, the process aid 103 is adjusted to a 0% energy level output in step 303, the algorithm is exited in step 304 and step 301 is then repeated at the appropriate interval. Should the determination at step 302 be that the feeder 102 is running, step 305 queries whether an unexpected weight disturbance condition exists. If the answer is yes, then a control disturbance counter is incremented at step 306, the algorithm is exited in step 307, and step 301 is repeated as appropriate.

If an unexpected weight disturbance is not detected at step 306, then at step 308 the controller 104 determines whether or not the integral control contribution of the feeder control algorithm exceeds a certain threshold. Specifically, in the illustrated embodiment, step 308 refers to an error condition known as integral windup. Integral windup is a Proportional Integral Derivative (PID) control term commonly used in the control industry. In one embodiment, windup is a condition that occurs when the calculated mass flow rate is less than the set-point mass flow rate at a time when the motor speed of the feeder is unable to increase thus generating a negative error in response. In this scenario, an integrated error term, which is already negative, starts to decrease rapidly which in turn causes the feeder integrated error Fiv, which is the integral portion of the PID controller output and is calculated as the drive command value minus the most recent proportional contribution, to increase rapidly so as to try to correct for the error. During normal gravimetric operations of a preferred embodiment of the system, the feeder integrated error Fiv normally has the same value as the feeder's Drive Command value, which preferably corresponds to the operating percentage of the feeder's total screw speed e.g., 40%. The proportional contribution is normally small.

In step 308, if the Fiv calculation is greater than a threshold value (e.g., a ceiling value) indicating that integral windup is present, the control disturbance counter is incremented in step 309, and step 310 is reached.

At step 310, controller 104 checks for a mode of operation indication. In one embodiment, system 100 operates in two modes (e.g., a gravimetric mode and a volumetric mode). In one embodiment, when system 100 is operating in a first mode, controller 104 calculates a Mode 1 First Process Variable at step 312. Similarly, when system 100 is operating in a second mode, controller 104 calculates a Mode 2 First Process Variable at step 311. In the embodiment of FIG. 3A, in either mode, the calculated First Process Variable is used in step 313 as described in more detail below.

In one embodiment the two modes of operation of system 100 are a gravimetric mode and a volumetric mode. In one embodiment of gravimetric mode, a drive command is adjusted to maintain mass flow through feeder 102 (e.g., to a selected set point). A drive command is preferably a ratio of the current motor speed of feeder 102 to the maximum motor speed of feeder 102. A PID controller is one method used to control the feeder motor speed. In an embodiment of volumetric mode, the drive command is kept constant (e.g., unless it is purposefully adjusted) and the calculated mass flow will vary.

Exemplary embodiments of gravimetric mode and volumetric mode First Process Variable Calculations will now be discussed. As illustrated in FIG. 3A, in one embodiment, at step 312, system 100 operates in volumetric mode and the Mode 1 First Process Variable may be an instantaneous feed factor, calculated at step 312 by the equation Inst FF=MF/DC where MF is the mass flow through feeder 102 and DC is the feeder drive command. In one embodiment, the mass flow is a calculated value and the drive command is fixed (e.g., unless it is purposefully adjusted). For example, if the feeder screw speed is operating at 40% of its maximum speed, and the feeder's mass flow rate is calculated as 65 Kg/h, the InstFF would be calculated as 65/0.4=162.5 Kg/h.

At step 311, system 100 is in gravimetric mode and the Mode 2 First Process Variable may be an instantaneous feed factor calculated by the equation InstFF=SP/Fiv where SP is a set-point (e.g., a mass flow set-point that is a predetermined set-point, a user selected set-point or an automatically selected set-point) and Fiv which is the integral portion of the PID controller output and is calculated as the drive command value minus the most recent proportional contribution. The determination of the most recent proportional contribution may be made by any method known to those of skill in the process control field. In one embodiment, the mass flow through the system is numerically approximately equal to the set-point when operating in gravimetric mode and the integral portion of the PID controller output is numerically approximately equal to the feeder screw speed as a percentage of the maximum feeder screw speed. Of course, a different First Process Variable may be used depending, for example, on the process aid used and the control desired.

In accordance with the example of FIGS. 3A-3C, regardless of the mode system 100 is in, at step 313, controller 104 incrementally sums the calculated First Process Variable at step 313 as process 300 loops (e.g., every 250 ms) following the equation PV Sum=PV Sum+PV. So for example, where the First Process Variable is an Instantaneous Feed Factor (such as described above), the incremental sum at step 313 is InstFF Sum=Inst FF Sum+Inst FF. At step 314, controller 104 checks the number of loops. If the number of loops reaches a preset limit, controller 104 checks if the system is empty. As one of skill in the art will appreciate, steps 314 and 315 can occur in many locations throughout the process and the preset limit can be selected by a person of skill in the art.

At step 315 the controller determines whether the system is running empty. In one embodiment, a subroutine is performed to determine whether or not the net weight of the system is low. There are many ways of determining whether or not a system is near empty, as one of ordinary skill in the art will appreciate. Any method may be used consistent with the invention. If it is determined that the system is near empty, the controller at step 316 sets a system empty flag. If the system is not near empty the flag is cleared in step 317.

At step 318 illustrated in FIG. 3B, the number of loops is checked to determine whether it has reached a second predetermined number of passes, such as 40. If the loop counter does not equal the predetermined number, the counter is incremented and the algorithm is exited in step 319 and returns to step 301 as appropriate. If the counter equals the predetermined number in step 318, then at step 320 an average of the first process variable is calculated and stored. In one embodiment, an instantaneous feed factor average (InstFF$_{avg}$) is calculated and stored in memory, such as in a circular FIFO buffer. For example, if the predetermined number is 40 and the time interval for the InstFF is 250 msec, then the InstFF$_{avg}$ is based on a ten second (i.e., 40 multiplied by 250 msec) interval. In addition, the loop counter is reset and the sum of the First Process Variable is reset.

Figure 4:
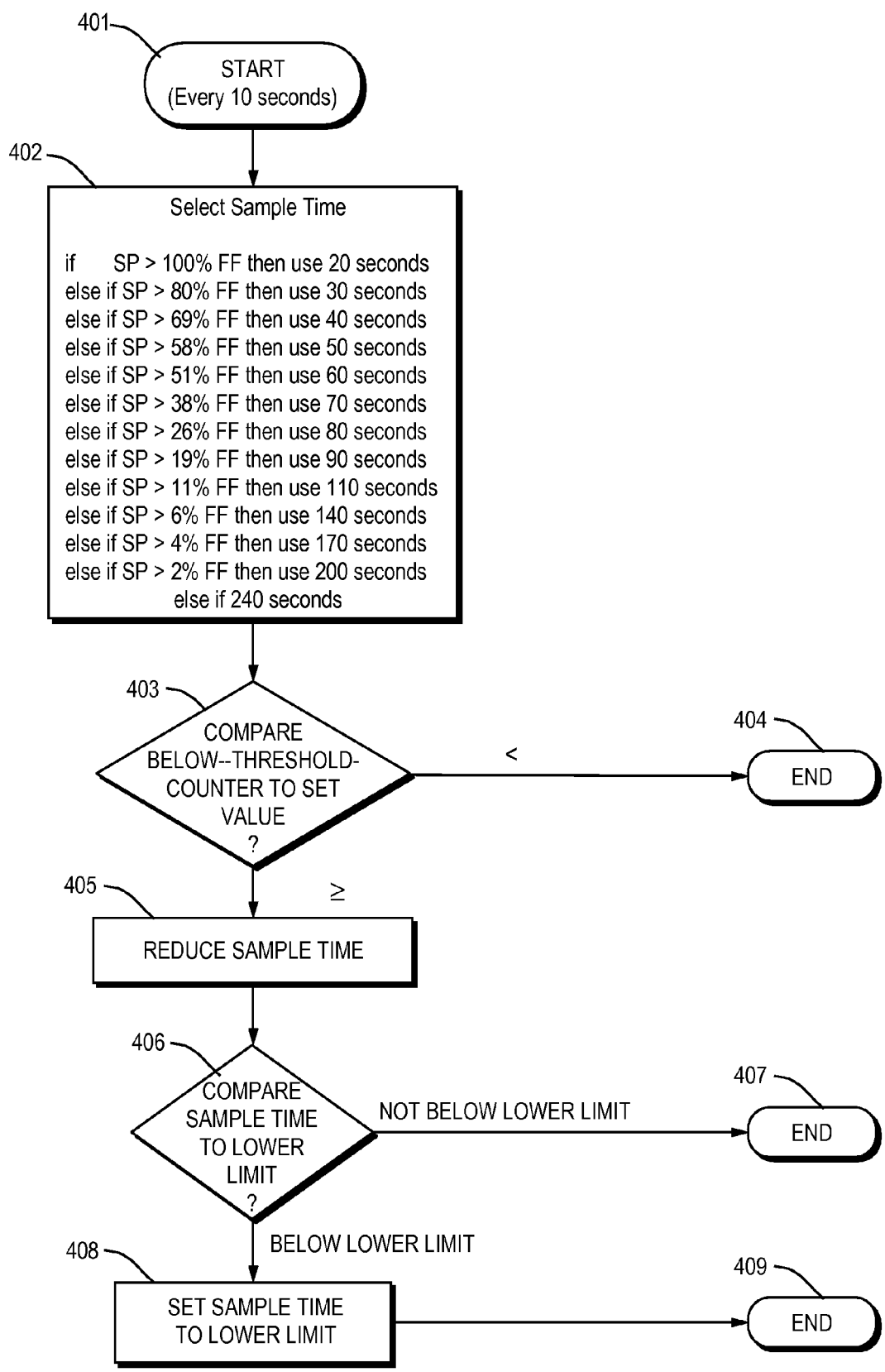
FIG. 4 provides an exemplary flow chart of a process for selecting the sample time of the process of FIGS. 3A-3C.

Next in step 321, a select sample time or size is retrieved and a sample count is calculated, for example, as illustrated in FIG. 4. The sample time or size may be related to the type of feeder and the type of material being dispensed. For example, a high-rate feeder can run empty in a minute or two after a deteriorating flow condition is sensed, while a low-rate feeder may take 20 or 30 minutes to run empty after such a condition is sensed. Accordingly, the sampling count or time may be smaller for a high-rate feeder than a low-rate feeder. The sample times may range, for example, from 20 seconds to 240 seconds. Further, the sample count may be calculated as the select sample time divided by time intervals, such as 10 second time intervals. The time intervals may be set to correspond to the time interval of InstFF$_{avg}$.

At step 322, the sample count is incremented. Thus, the sample count counter keeps count of the number of sample counts during the sample time. For example, the count kept by the sample counter may correspond to the number of the InstFF$_{avg}$ values stored in memory during the sample time.

At step 323, the controller queries whether the sample time selected in step 321 has expired by checking whether the sample count determined in step 321 has reached its limit. If the sample count has not reached its limit, the algorithm is exited in step 324 and step 301 is repeated. If the sample count in step 321 has reached its limit, the algorithm proceeds to step 325.

Using, for example, a linear regression technique, the controller 104 calculates a process variable slope at step 325. In one embodiment, a slope from a series of InstFF$_{avg}$ values retrieved from memory, such as those determined through the process described above. The number of InstFF$_{avg}$ values used to calculate the slope may equal the number of InstFF$_{avg}$ values stored during the sample time. For example, if the sample time for a particular feeder is 60 seconds, the sample count is 6 (e.g., 60 seconds divided by 10 second time intervals), and if the past 6 stored InstFF$_{avg}$ were 160, 161, 159, 160, 158, and 157, the process variable slope would be calculated as -0.657.

At step 326, the controller 104 normalizes the process variable slope calculated in step 325. In one embodiment, the process variable slope may be normalized as a percentage change of the InstFF$_{avg}$. For example, the slope may be represented as:

$$\text{slope (\%)} = 100\% * (\text{sample count} - 1) * \text{process variable slope} / \text{last InstFF}_{avg}$$

where slope (%) is the slope expressed as a percentage change in the InstFF$_{avg}$. Thus, continuing with the above example: slope (%)=100%*(6-1)*-0.657/157=-2.1%. In the example, the process variable (InstFF$_{avg}$) slope (%) has declined 2.1 percent during the previous sample time period.

A threshold value may be used to determine if there has been a significant deterioration of the process variable or not. For example, in one embodiment, the process variable threshold value (e.g., slope) is determined empirically. It may be a predetermined number for a given application or it may be adjusted as conditions warrant. In addition, as indicated at step 327, the process variable threshold value may be adjusted based on system conditions. In one embodiment, the process variable threshold value may be set to -4.5% and adjusted based upon the number of accumulated errors (e.g., as indicated by a control disturbance counter). In one embodiment, the process variable threshold value is adjusted up to a 0% slope. According to one example, if the control disturbance counter has accumulated a total of 5 counts during a predetermined period of time (e.g., the past 60 seconds), the process variable slope threshold would be adjusted to -4.0%, using the relationship: adjusted threshold value=-4.5%+ (control disturbance count/10). The process variable threshold is adjusted in recognition of the fact that in some cases it is more likely to have significant deterioration of the flow conditions when the control disturbance counter is high. After step 327, the control disturbance counter or error counter is reset to zero in step 328 for the next sample time period. Of course, adjustment of the process variable threshold may not be necessary in some applications.

In Step 329, the system empty flag from step 316 is checked and if the flag is set the process aid output is reduced (e.g., to 20% of the process aid's maximum output), and the algorithm is exited in step 337 and step 301 is repeated. On the contrary, if the check in step 329 reveals the system empty flag has been cleared, the algorithm proceeds to step 332.

The process variable slope (i.e., percent of slope change) is compared to the process variable threshold value in step 332. If the process variable slope is less than the process variable threshold value, a below threshold counter is incremented by 1 and an above threshold counter is reset to zero at step 333. This condition represents deteriorating flow conditions so that the process aid 103 output may be increased, for example, by 10%, of its maximum output in step 334. Of course, the process aid 103 output may be increased in several other ways, such as a by a fixed value or an increasing value. If the process variable slope is not less than the threshold value, indicating favorable flow conditions, the below threshold counter may be reset to zero and the above threshold counter incremented by 1 as illustrated in step 335.

In one embodiment, when a favorable flow condition exists for a sufficient period of time, the above threshold counter is incremented and compared against a threshold number in step 336. For example, if the above threshold counter is greater than the threshold number, the process aid 103 output is decreased in step 340 following a check that the process aid is operating above a process aid setting (e.g., floor threshold) in step 338. In one embodiment, the threshold number may be, for example, 5 and the output of process aid 103 may be decreased by a percentage, e.g., by 4% of its maximum output in step 340, or by a predetermined value. If the above threshold counter is less than the threshold number (5, in the example), the algorithm is exited in step 337 and step 301 is repeated. Further, if the process aid 103 is not above its process aid setting (e.g., floor threshold) in step 338, the algorithm is exited in step 339 and step 301 is repeated. In the example, favorable conditions must exist at least five times longer than deteriorating flow conditions in order to affect a decrease in process aid output.

FIG. 4 illustrates an example of a process for selecting the sample time, as discussed above in connection with step 321 of FIG. 3B. As indicated at step 401, the process steps of FIG. 4 may be repeated at a predetermined interval, for example, every 10 seconds. Alternatively, the process steps of FIG. 4 may be invoked upon the occurrence of a predetermined condition. In one embodiment, the sample time is retrieved and the sample count generated. See the description above and the flow chart in FIG. 4. At step 402, the sample time is selected. The sample time may be selected depending on the mass flow set-point relative to the feed factor. For example, the closer the mass flow rate set-point is to the feed factor, the lower the sample time. In particular, the sample time in step 402 may be a function of the mass flow rate set-point of the user and the calculated instantaneous feed factor InstFF. Sample time may vary, for example, from 20 seconds to 240 seconds. Step 402 indicates one possible relationship between sample time and the set-point SP and the feed factor FF (i.e., InstFF). The sample time may be selected from a lookup table. The sample count may be determined as the sample time divided by predetermined number of time intervals, for example, 10 seconds, as discussed above. However, this description is intended as an example and other relationships are possible.

After the sample time is selected, the controller 104 at step 403 compares the below threshold counter (from steps 333 and 335 of FIG. 3C) to a set value (e.g., the set value may be 2 or another predetermined number). If the below threshold counter is not greater than or equal to the set value, the subroutine is exited in step 404 and returned to step 401 at the appropriate time. If the below threshold counter is greater than or equal to the set value, the sample time is reduced in step 405. For example, the sample time may be reduced by a fixed amount or a percentage amount. In one embodiment, the sample time is divided by a fixed value, e.g., 2. Step 406 ensures that the reduced sample time is not less than a lower limit. If the reduced sample time is less than the lower limit, then the sample time may be set to the lower limit at step 408. In accordance with one example, the lower limit may be 20 seconds. Steps 407 and 409 exit the subroutine from steps 406 and 408, respectively.

Figure 5:
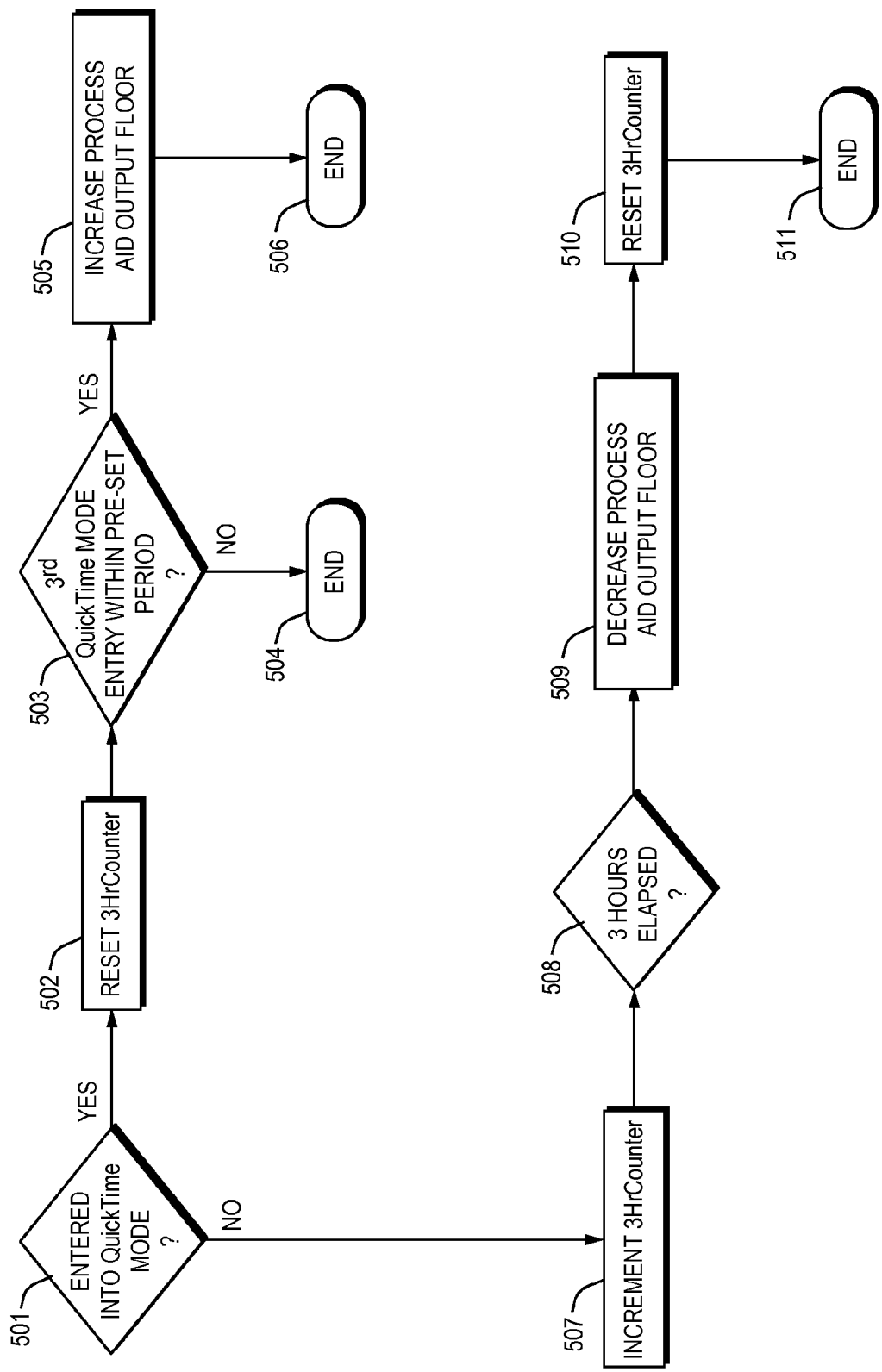
FIG. 5 provides an exemplary flow chart of a process for adjusting the process aid floor according to one embodiment of the present invention.

The concept of long-term floor adjustment of the process aid will be described in connection with the example illustrated in FIG. 5. Long-term floor adjustment involves raising or lowering the initial starting point of energy output for the process aid (i.e., the floor value) in response to operating conditions sensed over a longer time period than the time periods discussed above. In one embodiment, the floor value is either increased or decreased by 5% based on the frequency of the system entering a prescribed mode (e.g., a quick time mode).

In the embodiment described in FIG. 5, quick time mode may be entered when the below threshold counter from step 403 is greater than or equal to a predetermined value (e.g., 2), and the sample time is reduced in step 405. In FIG. 5, the controller 104 at step 501 queries whether or not the quick time mode has been entered. If it has not been entered, the controller 104 increments a counter or starts a clock at step 507. For example, the counter or clock may be designed to measure a period of time, such as three hours. If quick time mode has been entered, the counter or clock is reset in step 502. Then in step 503, the controller 104 checks whether quick time mode has been entered a particular number of times in a pre-set period, such a one hour. If the quick time mode exceeds the count number in the time period, a floor value of the process aid output is increased in step 505, and the subroutine is returned to step 501 from step 506. If the quick time mode does not exceed count value in the pre-set period the subroutine is returned to step 501 from step 504.

Returning to step 507, if quick time mode in step 501 has not been entered, the running counter or clock is started. At step 508, the controller 104 checks whether or not the quick time mode has been entered at all during a time period. If quick time mode has not been entered in the time period, the controller 104 at step 509 decreases the process aid output floor. At step 510, the controller resets the counter or clock, and at step 511 returns the subroutine to step 501.

In one embodiment, such as in steps 501-506, the floor value (e.g., the minimum allowed process aid output commanded by the subroutine when the process aid is operating normally) is increased by 5% if the system has entered the quick time mode 3 times within the preceding 1 hour. On the other hand, in steps 507-511, the floor value is decreased by 5% if the system has not entered the quick time mode within the preceding 3 hours and the process aid is not already at a minimum floor value. In one embodiment, floor value is by-passed when it is determined that the system is empty of material. Thus the process aid output would be reduced to, for example, 20% of the maximum process aid output.

There is thus a method of the present invention involving material handling system 100, 200 having a material feeder 102, material container 101 configured to discharge material to material feeder 102 and process aid 103 engaged with material container 101. That method includes determining a process indicator associated with a material flow characteristic of feeder 102 during operation of feeder 102; determining a difference between the process indicator and a indicator threshold value; and adjusting the operation of process aid 103 based on the value of the difference between the process indicator and the indicator threshold value.

In one embodiment of the method the difference between the process indicator and the indicator threshold value is indicative of a deteriorating flow condition in material container 101. Thus, by determining such a difference one may anticipate the deteriorating flow condition and thereby intercede to prevent, retard, delay or minimize the condition and/or the degree to which that condition occurs. For example, that condition may be a bridging condition or such other conditions identified herein or otherwise known to those of skill in the art.

In one embodiment of the method, the process indicator includes a rate of change in a process variable during a selected time interval (e.g., the InstFF$_{avg}$] For example, the process indicator may be one or more measurable or otherwise observable characteristic of feeder 102. The process indicator may be indicative of a trend in feeder 102 (e.g., a trend associated with material flow through the feeder). In one embodiment, the characteristic of feeder 102 is a flow characteristic. For example, the flow characteristic may be a function of the mass flow rate of the system. By way of further example, the process variable may be any variable characteristic of feeder 102. In one embodiment, a process variable is automatically determined by system 100, 200 and the rate of change of the process variable during the selected time interval is calculated.

One example of the process variable is an average feed factor as described above. In one embodiment, the average feed factor is calculated by Equation (1) where FF$_{avg}$ is the average feed factor, MF is the mass flow rate through feeder 102 and % MS is a ratio of the current motor speed of feeder 102 to a maximum motor speed of feeder 102 and N is a predetermined number of time intervals. In one embodiment the time intervals are established in controller 104, 204 and may be fixed or variable.

The method may employ any of the process aids referenced herein or a process aid known to those of skill in the art that may be selected for use in the disclosed method. In one embodiment, process aid 103 is a vibrator (e.g., a dynamically adjustable externally mounted vibrator). The method of the present invention may include adjusting the operation of process aid 103 as a function of a process indicator, or process variable. For example, where process aid 103 is a vibrator, the amplitude and/or frequency of the vibrator may be varied in response to an observed characteristic of the feeder (e.g., a difference between a process indicator and an indicator threshold value).

In one embodiment, adjusting the operation of the process aid takes place in advance of a significant flow disruption in the material container. Furthermore, the significant flow disruption may be characterized by a material flow rate through material container 101 that is substantially different from a material flow rate through material feeder 102.

In one embodiment, the threshold value used to compare to the process indicator is variable. In one such embodiment, if a flow characteristic in material container 101 is identified (e.g., measured, quantified or detected) that indicates a flow disruption is imminent or present, the threshold can be adjusted so that a comparison of the process indicator and the threshold would trigger an adjustment to process aid 103. Thus, in one embodiment, the method of the present invention includes adjusting the indicator threshold value in response to the detection of a flow condition in the material container.

In one embodiment, the flow condition is characterized by a process variable being substantially constant for a selected period. For example, in one embodiment, where a process variable remains constant during a selected period, system 100, 200 may be configured to adjust the threshold value such that an output of process aid 103 would decrease.

In one embodiment, the method of the present invention includes establishing a minimum output for process aid 103 and adjusting the minimum output for the process aid based upon the difference between a process indicator and an indicator threshold value. For example, the minimum output may be a minimum amplitude for operating a vibrator. In some embodiments, the minimum amplitude may be adjusted depending upon how often the difference between the process indicator and the indicator threshold value reaches a given level. For example, (e.g. see steps 501-511 in FIG. 5) In one embodiment, the minimum amplitude may beset and variations to the amplitude (e.g., in anticipation of a flow problem in material container 101) are made relative to that minimum and preferably returned to the minimum when the higher amplitude is no longer required. Thus, in one embodiment, the minimum output for a vibrator is the lowest operational vibrator amplitude of material handling system 100, 200.

There is also an embodiment of the present invention that includes in a bulk material handling system having material feeder 102, material container 101 configured to discharge material to material feeder 102 and a vibrator 203 configured to vibrate the material container, a method for maintaining consistent flow that includes periodically calculating a process variable associated with a material flow characteristic of the feeder during operation of the feeder; determining a process variable slope during a selected time interval, the process variable slope defined as a rate of change in the process variable; determining a difference between the process variable slope and a threshold value; adjusting the operation of the vibrator based on the value of the difference between the process variable slope and a threshold value. In one embodiment, the adjusting step includes decreasing at least one of vibrator amplitude and vibrator frequency when the value of the difference between the process variable slope and a threshold value is greater than zero after a selected time period. In one embodiment of the method, the difference between the process variable slope and the threshold value is indicative of a deteriorating flow condition in the material container. In a further embodiment, the process variable is an average feed factor calculated by Equation (1) herein. In one embodiment, the method further includes adjusting the operation of vibrator 203 including, changing the amplitude of vibration and/or the frequency of vibration by, for example, a predetermined amount when the value of the difference between the process variable slope and a threshold value is less than zero.

In a further embodiment, adjusting the operation of the vibrator 203 includes increasing the amplitude of vibration when the difference between the process variable slope and the threshold value is less than or equal to zero and decreasing the amplitude of vibration when the difference between the process variable slope and the threshold value is greater than zero.

In one embodiment, the selected time interval is based at least in part upon a user defined set-point. For example, the user defined set-point is based at least in part upon a selected flow rate (e.g., the mass flow rate or a volumetric flow rate) of material through the feeder.

In one embodiment, the method also includes the steps of establishing a minimum output for the vibrator; and adjusting the minimum output for the vibrator based upon the difference determined in step c. Moreover, the vibrator 203 may have a frequency that is adjustable (e.g., dynamically adjustable and/or automatically adjustable) and the method further includes the step of setting the vibrator frequency to operate at a frequency that is based upon a system resonance point.

Also as described above, adjusting the operation of vibrator 203 may take place in advance of a significant flow disruption in material container 101. In one embodiment, the significant flow disruption is characterized by a material flow rate through material container 101 that is substantially different from a material flow rate through material feeder 102.

In another embodiment, the method includes adjusting the threshold value in response to the detection of a flow condition in material container (e.g., a change in mass flow from the material container in excess of a predetermined value, vertical tunneling, bridging, and a significant time without a negative flow condition). In one example, the flow condition is characterized by the process variable being, e.g., above the threshold value for a selected period. In a further configuration, the flow condition is characterized by the process variable being substantially different for a selected period (e.g., dynamically selected from a look up table or selected by a user prior to system operation). In one embodiment, the flow condition is associated with a weight disturbance. In one embodiment, the method further includes adjusting at least one of vibrator 203 frequency and vibrator 203 amplitude based on the fill level in material container 101.

The present invention also includes a bulk material transfer system including bulk material container 101; process aid 103 (e.g., vibrator 203, a vertical agitator(s), an air bladder(s), an air pad(s), an air injector(s), an impactor(s), an auger(s), a horizontal agitator(s), a sonic device(s), an acoustic device(s), a mechanically actuated flexible liner, combinations thereof and the like) with a variable output engaged with bulk material container 101 (e.g., engaged outside material container 101 or engaged inside material container 101); feeder 102 (e.g., a feeder is a loss-in-weight feeder) positioned to receive bulk material from bulk material container 101 (e.g., an asymmetrical feed hopper), and configured to transfer the bulk material through feeder 102; and a control system (e.g., a control system including controllers 104, 204 and/or weigh scale system 106) configured to identify a trend associated with the transfer of bulk material through feeder 102 (e.g., a trend that is associated with a material flow condition in the system) and configured to affect a change in the variable output of process aid 103 based on the trend. In one embodiment, the control system is configured to periodically calculate a process variable (e.g., a characteristic of feeder 102, calculated from equation (1) associated with a material flow characteristic of feeder 102 during operation of feeder 102; determine a process variable slope defined as a rate of change in the process variable during a selected time interval; determine a difference between the process variable slope and a threshold value; and adjust the operation of process aid 103 based on the value of the difference between the process variable slope and a threshold value.

In one embodiment, process aid 103 is dynamically adjustable (e.g., adjustable during operation of system 100, 200) to allow the variable application of energy from a lower level of energy when deteriorating flow conditions are not detected to a higher level of energy in when deteriorating flow conditions are detected.

In one embodiment, the trend is associated with a material flow condition that includes a substantial disparity between a material flow rate through the material container and a material flow rate through the feeder. In one embodiment, the trend is associated with a process indicator (e.g., that includes a rate of change in a process variable during a selected time interval) and controller 104, 204 is configured to change the variable output of process aid 103 based at least in part on the process indicator.

In a further embodiment, controller 104, 204 changes the variable output based at least in part upon a comparison of the process indicator to an indicator threshold (e.g., that is based upon a material processing characteristic).

In one embodiment, the process variable is determined by the equation:

$$PV = \frac{\sum_{n=1}^{N} \frac{FR}{\% FR}}{N}$$ (Equation (2))

wherein PV is the process variable, FR is a flow rate through the feeder, % FR is a ratio of a current motor speed of the feeder to a maximum motor speed of the feeder, and N is a time factor taken from the group consisting of a predetermined number of time intervals and a predetermined period of time.

The specific embodiments contained herein are only exemplary. Variations to the specific details of the embodiments disclosed may be made without detracting from the spirit of the invention. Those variations may include the elimination of some of the features identified in the exemplary embodiments or the substitution of features among the exemplary embodiments. Other variations and modifications in the details, materials, steps and arrangement of parts, which have been herein described and illustrated in order to explain the nature of the preferred embodiment of the invention may be made without departing from the spirit or scope of the invention.

What I claim is:

1. In a bulk material handling system having a material feeder, a material container configured to discharge material to the material feeder and a vibrator configured to vibrate the material container, a method for maintaining consistent flow comprising:

a. periodically calculating a process variable associated with a material flow characteristic of the feeder during operation of the feeder, the process variable being an average feed factor calculated by the equation:

$$FF_{avg} = \frac{\sum_{n=1}^{N} \frac{MF}{\% MS}}{N}$$

wherein $FF_{avg}$ is the average feed factor, MF is the mass flow rate through the feeder and % MS is a ratio of a current motor speed of the feeder to a maximum motor speed of the feeder and N is a predetermined number of time intervals;

b. determining a process variable slope during a selected time interval, the process variable slope defined as a rate of change in the process variable;

c. determining a difference between the process variable slope and a threshold value; and d. adjusting the operation of the vibrator based on the value of the difference determined in step c.

2. The method of claim 1 wherein the difference between the process variable slope and the threshold value is indicative of a deteriorating flow condition in the material container.

3. The method of claim 1 wherein adjusting the operation of the vibrator includes changing an amplitude of vibration.

4. The method of claim 1 wherein adjusting the operation of the vibrator includes changing a frequency of vibration.

5. The method of claim 1 wherein adjusting the operation of the vibrator includes increasing an amplitude of vibration by a predetermined amount when the value of the difference in step c, calculated by subtracting the threshold value from the process variable slope, is less than zero.

6. The method of claim 1 wherein adjusting the operation of the vibrator includes increasing an amplitude of vibration when the difference in step c, calculated by subtracting the threshold value from the process variable slope, is less than zero and decreasing the amplitude of vibration when the difference in step c, calculated by subtracting the threshold value from the process variable slope, is greater than or equal to zero.

7. The method of claim 1 wherein the selected time interval is based at least in part upon a user defined set-point.

8. The method of claim 7 wherein the user defined set-point is based at least in part upon a selected flow rate of material through the feeder.

9. The method of claim 1 further comprising:
establishing a minimum output for the vibrator; and
adjusting the minimum output for the vibrator based upon the difference determined in step c.

10. The method of claim 1 wherein a frequency of the vibrator is adjustable and the method further comprises:
setting the vibrator frequency to operate at a frequency that is based upon a system resonance point.

11. The method of claim 2 wherein adjusting the operation of the vibrator takes place in advance of a significant flow disruption in the material container.

12. The method of claim 11 wherein the significant flow disruption is characterized by a material flow rate through the material container that is substantially different from a material flow rate through the material feeder.

13. The method of claim 1 further comprising:
adjusting the threshold value in response to detection of a flow condition in the material container.

14. The method of claim 13 wherein the flow condition is characterized by the process variable being substantially constant for a selected period.

15. The method of claim 13 wherein the flow condition is characterized by the process variable being substantially different for a selected period.

16. The method of claim 13 wherein the flow condition is associated with a weight disturbance.

17. The method of claim 13 wherein the flow condition is taken from the group consisting of a) a change in mass flow from the material container in excess of a predetermined value, b) vertical tunneling, c) bridging, and d) a significant time without a negative flow condition.

18. The method of claim 1 wherein the adjusting of step d includes:
decreasing at least one of vibrator amplitude and vibrator frequency when the value of the difference determined in step c, calculated by subtracting the threshold value from the process variable slope, is greater than zero after a selected time period.

19. The method of claim 1 further comprising adjusting at least one of vibrator frequency and vibrator amplitude based on a fill level in the material container.

20. A bulk material transfer system comprising:
a bulk material container;
a process aid with a variable output engaged with the bulk material container;
a feeder positioned to receive bulk material from the bulk material container, and configured to transfer the bulk material through the feeder; and
a controller system configured to identify a trend associated with the transfer of bulk material through the feeder and configured to affect a change in the variable output of the process aid based on the trend, the trend being associated with a process indicator and the controller is configured to change the variable output of the process aid based at least in part on the process indicator, the controller changing the variable output based at least in part upon a comparison of the process indicator to an indicator threshold, the indicator being a function of a process variable being determined by the equation:

$$PV = \frac{\sum_{n=1}^{N} \frac{FR}{\% FR}}{N}$$

wherein PV is the process variable, FR is a flow rate through the feeder, % FR is a ratio of a current motor speed of the feeder to a maximum motor speed of the feeder, and N is a time factor taken from the group consisting of a predetermined number of time intervals and a predetermined period of time.

21. The system of claim 20 wherein the control system is configured to
a. periodically calculate a process variable associated with a material flow characteristic of the feeder during operation of the feeder;
b. determine a process variable slope defined as a rate of change in the process variable during a selected time interval;
c. determine a difference between the process variable slope and a threshold value; and
d. adjust the operation of the process aid based on the value of the difference determined in step c.

22. The system of claim 20 wherein the process aid is mounted outside the material container.

23. The system of claim 20 wherein the material container is an asymmetrical feed hopper.

24. The system of claim 20 wherein the feeder is a loss-in-weight feeder.

25. The system of claim 20 wherein the process aid is a vibrator.

26. The system of claim 20 wherein the process aid is taken from the group consisting of, a vertical agitator, an air bladder, an air pad, an air injector, an impactor, an auger, a horizontal agitator, a sonic device, an acoustic device, and a mechanically actuated flexible liner.

27. The system of claim 20 wherein the process aid is dynamically adjustable to allow a variable application of energy from a lower level of energy when deteriorating flow conditions are not detected to a higher level of energy when deteriorating flow conditions are detected.

28. The system of claim 20 wherein the trend is associated with a material flow condition in the system.

29. The system of claim 28 wherein the material flow condition includes a substantial disparity between a material flow rate through the material container and a material flow rate through the feeder.

30. The system of claim 20 wherein the process indicator includes a rate of change in a process variable during a selected time interval.

31. The system of claim 30 wherein the process variable is a characteristic of the feeder.

32. The system of claim 30 wherein the indicator threshold is based upon a material processing characteristic.

33. In a material handling system having a material feeder, a material container configured to discharge material to the material feeder and a process aid engaged with the material container, a method comprising:
  a. determining a process indicator associated with a material flow characteristic of the feeder during operation of the feeder, the process indicator including a rate of change in a process variable during a selected time interval, the process variable being an average feed factor calculated by the equation:

$$FF_{avg} = \frac{\sum_{n=1}^{N} \frac{MF}{\% MS}}{N}$$

wherein $FF_{avg}$ is the average feed factor, MF is the mass flow rate through the feeder and % MS is a ratio of a current motor speed of the feeder to a maximum motor speed of the feeder and N is a predetermined number of time intervals;
  b. determining a difference between the process indicator and an indicator threshold value; and
  c. adjusting the operation of the process aid based on the value of the difference determined in step b.

34. The method of claim 33 wherein the difference between the process indicator and the indicator threshold value is indicative of a deteriorating flow condition in the material container.

35. The method of claim 33 wherein the process aid is a vibrator and adjusting the operation of the process aid includes varying at least one of an amplitude and a frequency of the vibrator.

36. The method of claim 33 wherein adjusting the operation of the process aid takes place in advance of a significant flow disruption in the material container.

37. The method of claim 36 wherein the significant flow disruption is characterized by a material flow rate through the material container that is substantially different from a material flow rate through the material feeder.

38. The method of claim 33 further comprising: adjusting the indicator threshold value in response to detection of a flow condition in the material container.

39. The method of claim 38 wherein the flow condition is characterized by a process variable being substantially constant for a selected period.

40. The method of claim 33 further comprising: establishing a minimum output for the process aid; and adjusting the minimum output for the process aid based upon the difference determined in step c.

41. The method of claim 40 wherein process aid includes a vibrator and the minimum output for the process aid is a vibrator amplitude that is approximately a lowest operational vibrator amplitude of the material handling system.

42. In a bulk material handling system having a material feeder, a material container configured to discharge material to the material feeder and a vibrator configured to vibrate the material container, a method for maintaining consistent flow comprising:
  a. periodically calculating a process variable associated with a material flow characteristic of the feeder during operation of the feeder;
  b. determining a process variable slope during a selected time interval, the process variable slope defined as a rate of change in the process variable;
  c. determining a difference between the process variable slope and a threshold value; and
  d. adjusting the operation of the vibrator based on the value of the difference determined in step c,
  wherein adjusting the operation of the vibrator includes increasing an amplitude of vibration by a predetermined amount when the value of the difference in step c, calculated by subtracting the threshold value from the process variable slope, is less than zero,
  wherein the process variable is an average feed factor calculated by the equation $$FF_{avg} = \frac{\sum_{n=1}^{N} \frac{MF}{\% MS}}{N}$$

wherein $FF_{av}$ is the average feed factor, MF is a mass flow rate through the feeder, % MS is a ratio of a current motor speed of the feeder to a maximum motor speed of the feeder and N is a predetermined number of time intervals, and
  wherein adjusting the operation of the vibrator includes decreasing the amplitude of vibration when the difference in step c, calculated by subtracting the threshold value from the process variable slope, is greater than or equal to zero.

43. The method of claim 42 wherein the difference between the process variable slope and the threshold value is indicative of a deteriorating flow condition in the material container.

44. The method of claim 42 wherein adjusting the operation of the vibrator includes changing an amplitude of vibration.

45. The method of claim 42 wherein adjusting the operation of the vibrator includes changing a frequency of vibration.

46. The method of claim 42 wherein the selected time interval is based at least in part upon a user defined set-point.

47. The method of claim 46 wherein the user defined set-point is based at least in part upon a selected flow rate of material through the feeder.

48. The method of claim 42 further comprising:
  establishing a minimum output for the vibrator; and
  adjusting the minimum output for the vibrator based upon the difference determined in step c.

49. The method of claim 42 wherein a frequency of the vibrator is adjustable and the method further comprises:
  setting the vibrator frequency to operate at a frequency that is based upon a system resonance point.

50. The method of claim 43 wherein adjusting the operation of the vibrator takes place in advance of a significant flow disruption in the material container.

51. The method of claim 50 wherein the significant flow disruption is characterized by a material flow rate through the material container that is substantially different from a material flow rate through the material feeder.

52. The method of claim 42 further comprising:
  adjusting the threshold value in response to the detection of a flow condition in the material container.

53. The method of claim 52 wherein the flow condition is characterized by the process variable being substantially constant for a selected period.

54. The method of claim 52 wherein the flow condition is characterized by the process variable being substantially different for a selected period.

55. The method of claim 52 wherein the flow condition is associated with a weight disturbance.

56. The method of claim 52 wherein the flow condition is taken from the group consisting of a) a change in mass flow from the material container in excess of a predetermined value, b) vertical tunneling, c) bridging, and d) a significant time without a negative flow condition.

57. The method of claim 42 wherein the adjusting of step d includes:
decreasing at least one of vibrator amplitude and vibrator frequency when the value of the difference determined in step c, calculated by subtracting the threshold value from the process variable slope, is greater than zero after a selected time period.

58. The method of claim 42 further comprising adjusting at least one of vibrator frequency and vibrator amplitude based on a fill level in the material container.

59. In a bulk material handling system having a material feeder, a material container configured to discharge material to the material feeder and a vibrator configured to vibrate the material container, a method for maintaining consistent flow comprising:
a. periodically calculating a process variable associated with a material flow characteristic of the feeder during operation of the feeder;
b. determining a process variable slope during a selected time interval, the process variable slope defined as a rate of change in the process variable;
c. determining a difference between the process variable slope and a threshold value; and
d. adjusting the operation of the vibrator based on the value of the difference determined in step c including decreasing at least one of vibrator amplitude and vibrator frequency when the value of the difference determined in step c, calculated by subtracting the threshold value from the process variable slope, is greater than zero after a selected time period,
wherein the process variable is an average feed factor calculated by the equation $$FF_{avg} = \frac{\sum_{n=1}^{N} \frac{MF}{\% MS}}{N}$$

wherein FFavg is the average feed factor, MF is a mass flow rate through the feeder, % MS is a ratio of a current motor speed of the feeder to a maximum motor speed of the feeder and N is a predetermined number of time intervals; and wherein adjusting the operation of the vibrator includes increasing the amplitude of vibration when the difference in step c, calculated by subtracting the threshold value from the process variable slope, is less than zero and decreasing the amplitude of vibration when the difference in step c, calculated by subtracting the threshold value from the process variable slope, is greater than or equal to zero.

60. The method of claim 59 wherein the difference between the process variable slope and the threshold value is indicative of a deteriorating flow condition in the material container.

61. The method of claim 59 wherein adjusting the operation of the vibrator includes changing an amplitude of vibration.

62. The method of claim 59 wherein adjusting the operation of the vibrator includes changing a frequency of vibration.

63. The method of claim 59 wherein the selected time interval is based at least in part upon a user defined set-point.

64. The method of claim 63 wherein the user defined set-point is based at least in part upon a selected flow rate of material through the feeder.

65. The method of claim 59 further comprising:
establishing a minimum output for the vibrator; and
adjusting the minimum output for the vibrator based upon the difference determined in step c.

66. The method of claim 59 wherein a frequency of the vibrator is adjustable and the method further comprises:
setting the vibrator frequency to operate at a frequency that is based upon a system resonance point.

67. The method of claim 60 wherein adjusting the operation of the vibrator takes place in advance of a significant flow disruption in the material container.

68. The method of claim 67 wherein the significant flow disruption is characterized by a material flow rate through the material container that is substantially different from a material flow rate through the material feeder.

69. The method of claim 59 further comprising: adjusting the threshold value in response to the detection of a flow condition in the material container.

70. The method of claim 69 wherein the flow condition is characterized by the process variable being substantially constant for a selected period.

71. The method of claim 69 wherein the flow condition is characterized by the process variable being substantially different for a selected period.

72. The method of claim 69 wherein the flow condition is associated with a weight disturbance.

73. The method of claim 69 wherein the flow condition is taken from the group consisting of a) a change in mass flow from the material container in excess of a predetermined value, b) vertical tunneling, c) bridging, and d) a significant time without a negative flow condition.

74. The method of claim 59 further comprising adjusting at least one of vibrator frequency and vibrator amplitude based on a fill level in the material container.

* * * * *